Patented June 21, 1949

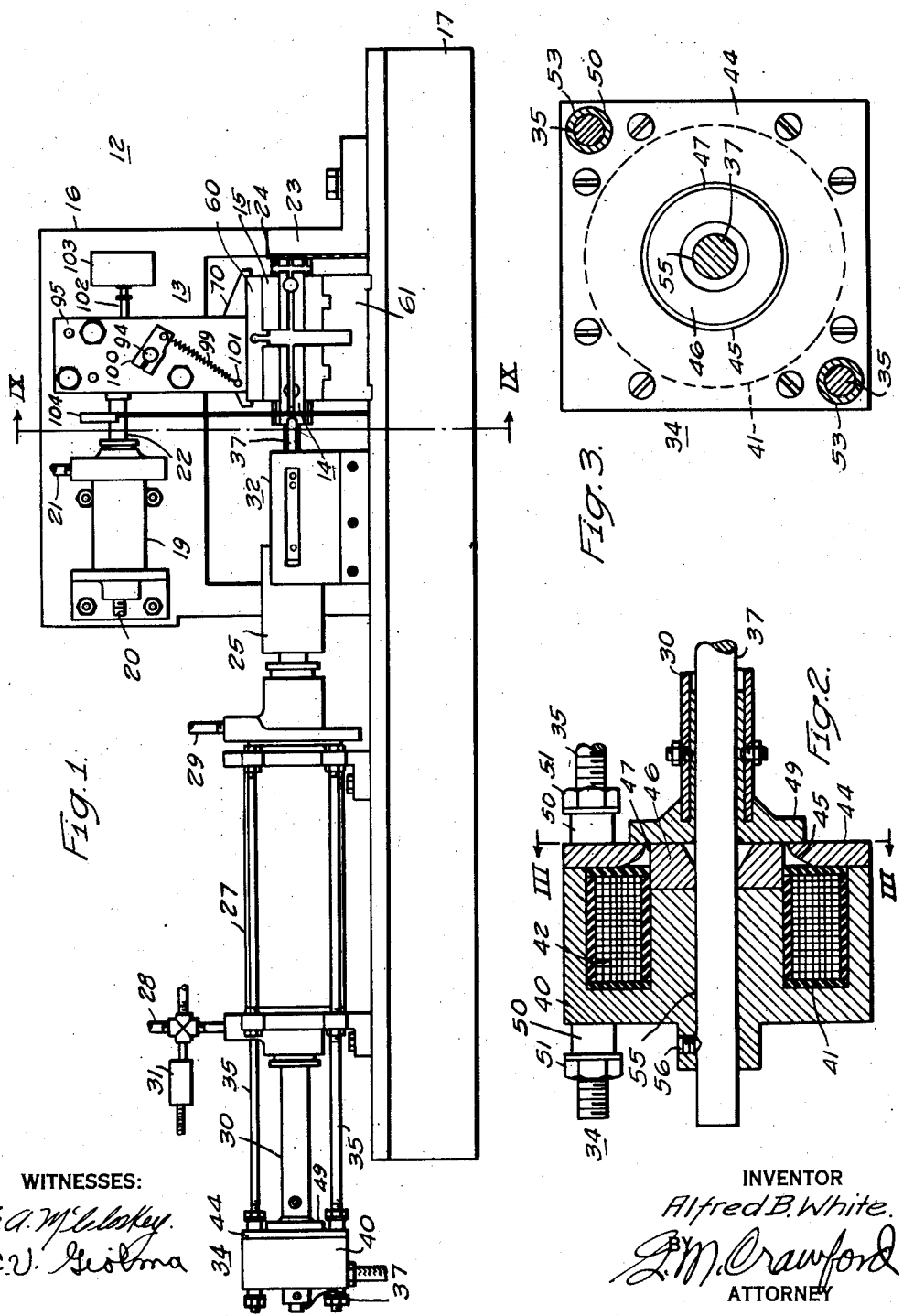

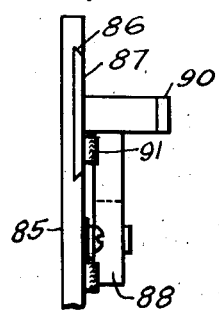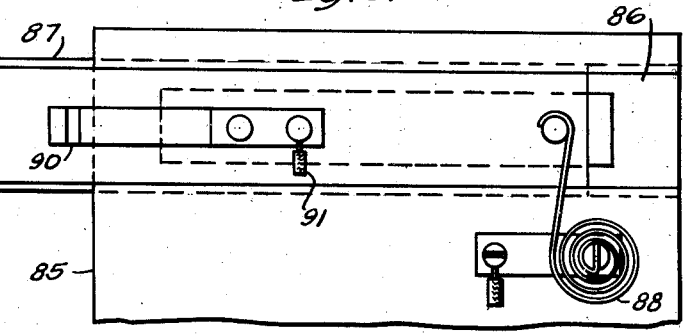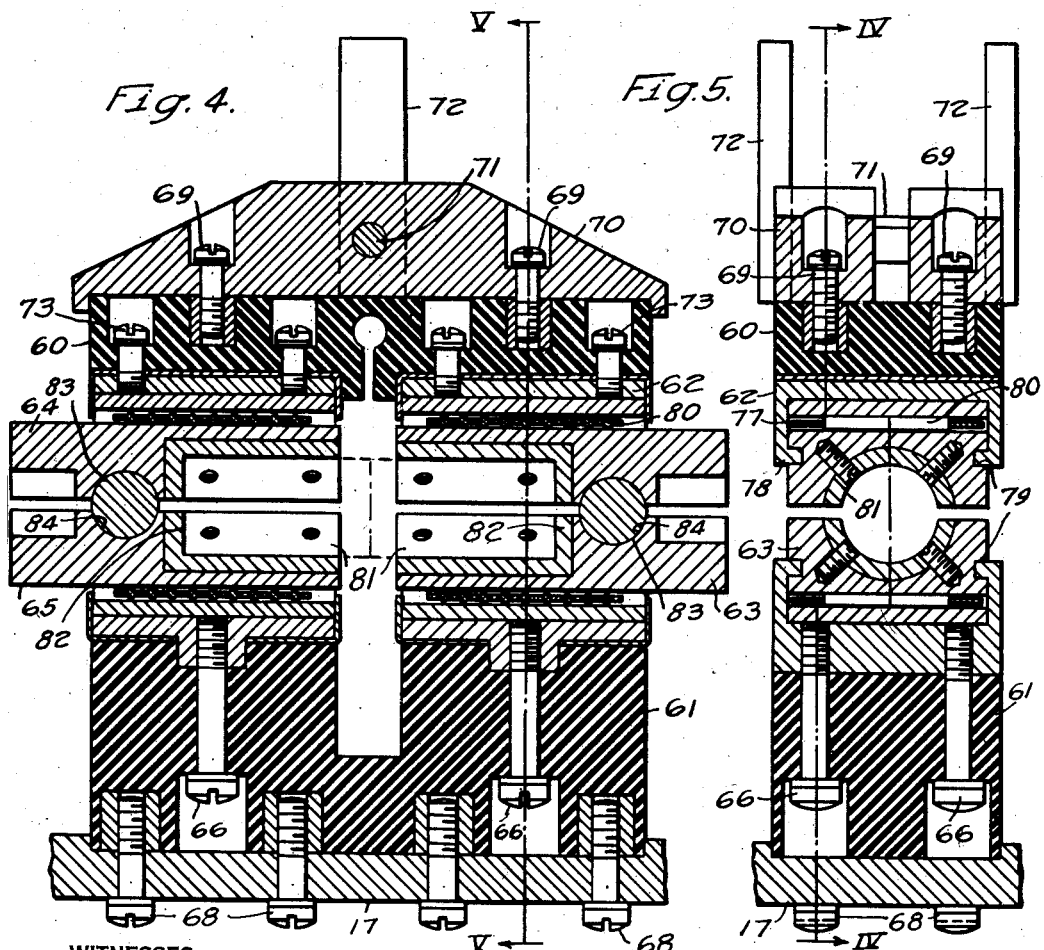

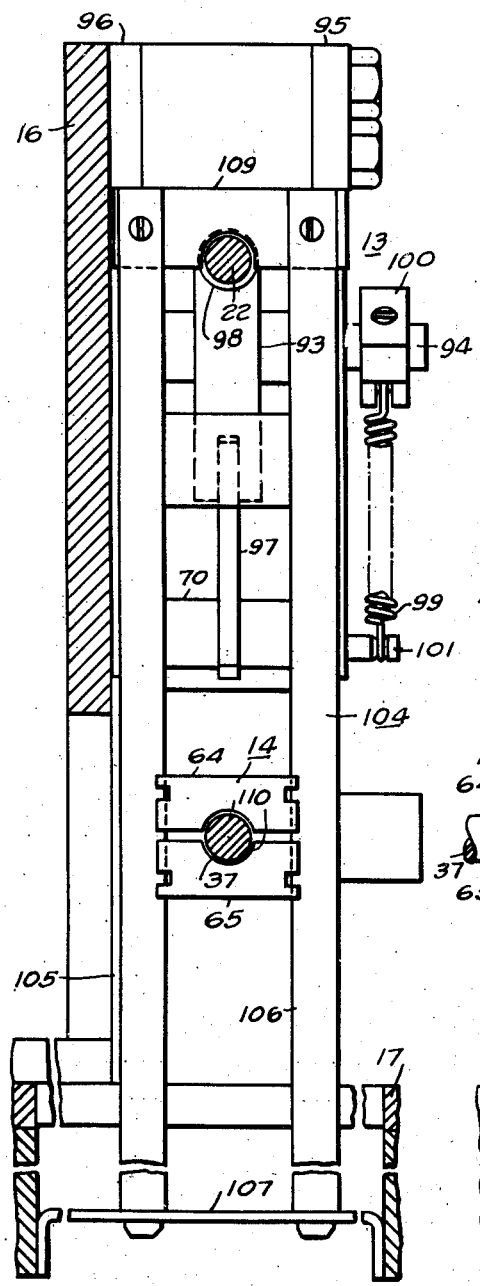

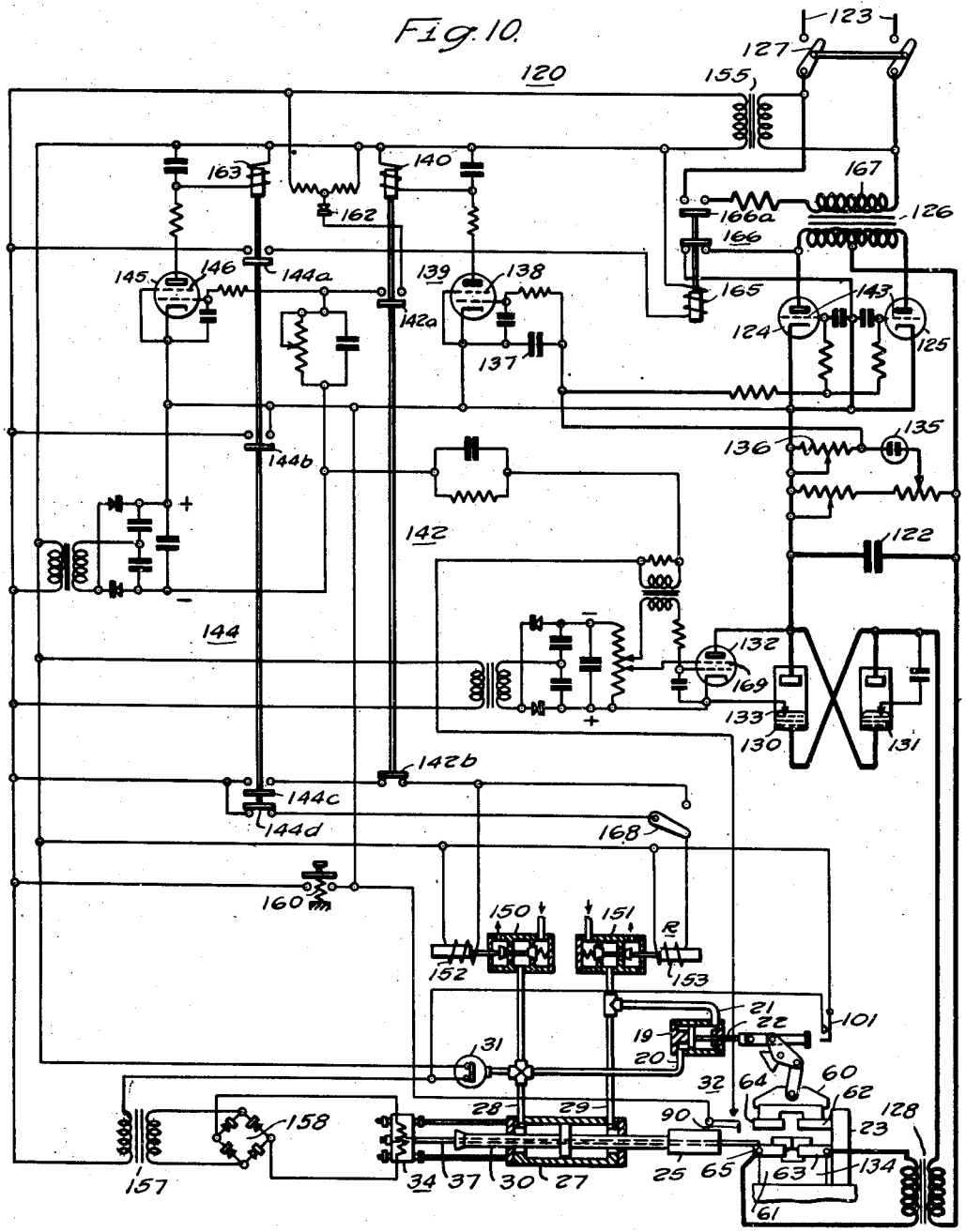

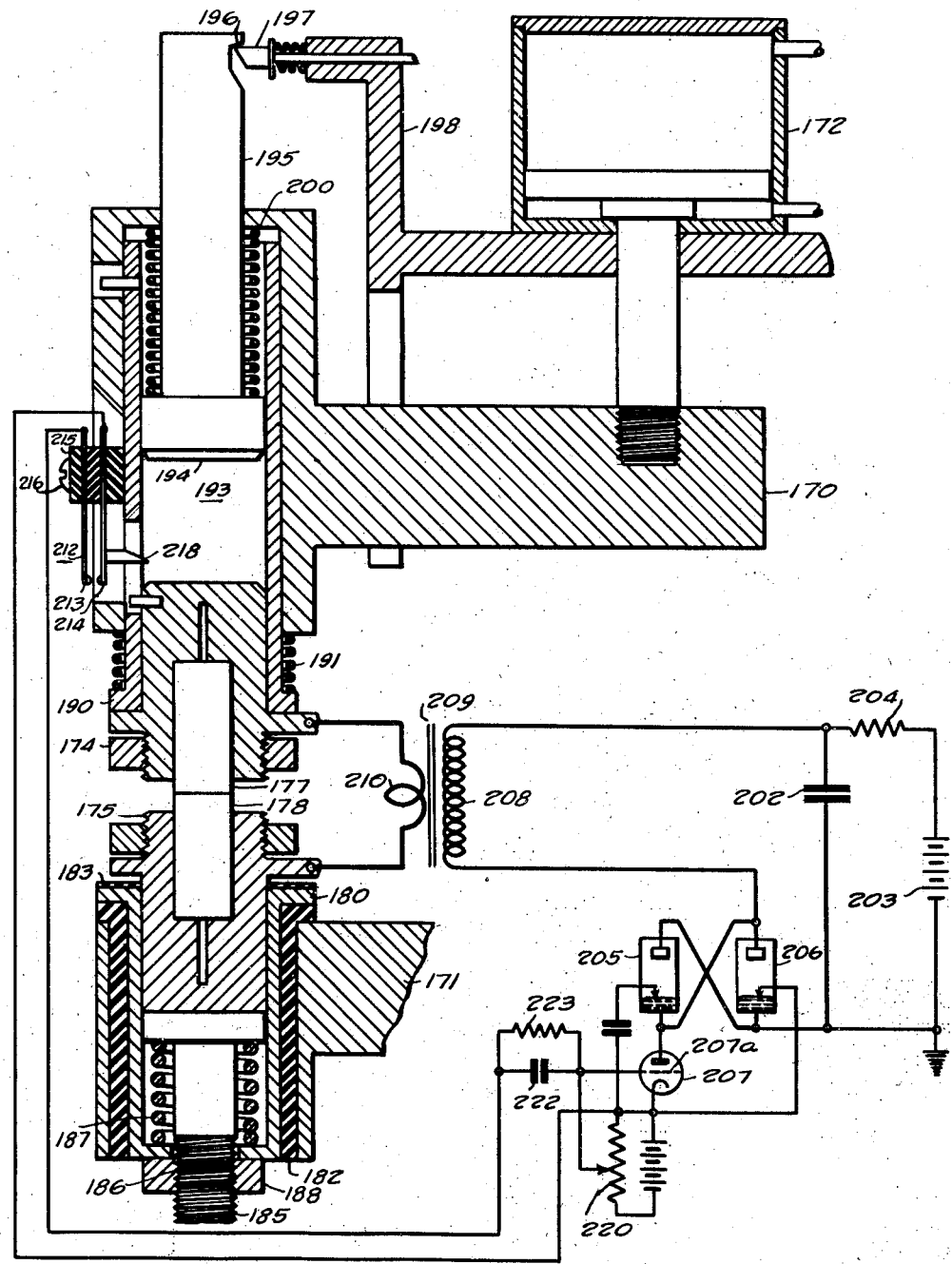

2,473,927

UNITED STATES PATENT OFFICE 2,473,927

APPARATUS FOR AND METHOD OF PERCUSSIVE WELDING

Alfred B. White, Murrysville, Pa., assignor to Westinghouse Electric Corporation, East Pittsburgh, Pa., a corporation of Pennsylvania Application May 7, 1946, Serial No. 667,761

16 Claims. (Cl. 219—4)

My invention relates, generally, to welding, and it has reference, in particular, to apparatus for, and a method of, percussive welding.

Generally stated, it is an object of my invention to provide percussive welding apparatus which is simple and inexpensive to manufacture, and is safe and reliable to operate.

More specifically, it is an object of my invention to provide for percussively welding members which are prepositioned in engagement, by discharging an electrical impulse therebetween, and applying an upset blow in timed-relation to said impulse.

It is an important object of my invention to provide for using a welding transformer to couple a condenser discharge circuit to members which are to be percussively welded, in order to prevent dangerously high potentials from existing between the members.

Another object of my invention is to provide for using a relatively light contact pressure between the members which are to be percussively welded when the flow of welding current therebetween is initiated, and for applying a relatively high upset pressure in predetermined timed relation thereto.

Yet another object of my invention is to provide for increasing the effective value of the weld current obtainable by the discharge of a condenser in a percussive welding system.

It is also an object of my invention to provide for percussively welding parts by using the stored energy of a condenser charged to a relatively high potential, while maintaining a relatively low potential difference between the parts to be welded.

It is also another object of my invention to provide for prepositioning parts to be percussively welded with a predetermined contact pressure therebetween, and reducing the contact pressure immediately prior to discharging a condenser through the parts and applying an upset force.

A further object of the invention is to provide for mounting members which are to be percussively welded in relatively light jaw members which are freely movable relative to each other.

A yet further object of my invention is to provide an improved method of percussive welding which is safe and easy to practice, and which produces improved and reliable results.

Other objects will in part be obvious, and will in part be explained hereinafter.

In accordance with one embodiment of my invention, the parts which are to be percussively welded together are positioned in engagement in relatively movable clamps or chucks which are connected to the secondary winding of a welding transformer. The primary winding of the transformer is connected by an electric discharge valve to a condenser which is charged from suitable source of electric energy. A hammer is provided having fluid pressure means for retracting it and actuating it to strike an upset blow against one of the clamps to force together the parts to be welded. An electromagnetic clutch retains the hammer in the retracted position until the fluid pressure reaches a predetermined value and the condenser is properly charged. The hammer is then released, and in moving it actuates a switch which renders the electric discharge valve conductive immediately prior to the application of the upset force, whereby the parts are percussively welded together.

For a more complete understanding of the nature and scope of my invention, reference may be made to the following detailed description, which may be studied in connection with the accompanying drawings, in which:

Figure 1 is a side elevational view of a percussive welding machine embodying its invention in one of its forms;

Fig. 2 is an enlarged horizontal sectional view of the magnetic clutch used to restrain the hammer on the machine shown in Fig. 1;

Fig. 3 is an enlarged end elevational view of the magnetic clutch taken along the line III—III of Fig. 2;

Fig. 4 is an enlarged elevational view in section of the jaw structure of the machine shown in Fig. 1 taken along the line IV—IV of Fig. 5;

Fig. 5 is an enlarged end elevational view in section of the jaw structure taken along the line V—V of Fig. 4;

Fig. 6 is an enlarged rear elevational view of the switch means shown in Fig. 1;

Fig. 7 is an enlarged end elevational view of the switch means shown in Fig. 6;

Fig. 8 is an enlarged partial front elevational view of the welding machine shown in Fig. 1, broken out in part to show details of the jaw operating mechanism;

Fig. 9 is an enlarged end elevational view of the jaw mechanism, taken along the line IX—IX, of Fig. 1;

Fig. 10 is a diagrammatic view of a percussive welding system embodying the invention of Figs. 1 through 9, and Fig. 11 is a diagrammatic view of welding apparatus embodying the invention in another of its forms.

Referring to Fig. 1 the reference numeral 12 may denote, generally, a percussive welding machine, wherein a jaw mechanism 13 including relatively movable chucks or clamps 14 and 15 may be mounted on a support 16 attached to a base 17, for positioning members which are to be percussively welded together. A fluid pressure cylinder 19 having forward and reverse fluid pressure connections 20 and 21, respectively, may be provided for actuating a piston rod 22 for moving the jaw mechanism into and out of operating position. A stop 23 may be utilized for backing up the clamp 15, and insulation 24 may be provided for insulating the clamp 15 from the base 17.

A hammer 25 may be arranged to strike the clamp 14 for applying an upset force to the members being welded. Operation of the hammer 25 may be effected by means of a fluid pressure operating mechanism 27 which may be provided with forward and reverse fluid pressure connections 28 and 29 for actuating a hollow piston rod 30 upon which the hammer 25 may be mounted. A fluid pressure control switch 31 is provided with the "forward" connection 28, and switch means 32 may be provided for controlling the application of an impulse of electrical energy to the members to be welded in response to the movement of the hammer 25.

An electromagnetic clutch 34 may be provided for retaining the piston rod 30 in the retracted position until predetermined operating conditions, which will be explained hereinafter, are fulfilled. By mounting the clutch 34 on longitudinal supports 35 with a predetermined degree of movement, the fluid pressure operating mechanism 27 may be utilized to apply a predetermined contact pressure to the members to be welded prior to the delivery of an upset. The clutch 34 may, for example, be connected to an elongated rod 37 which passes through the hollow piston rod 30 and engage the clamp 14, so as to bias the clamp 14 towards the clamp 15 while the clutch holds the hammer 25 against movement under the action of the fluid pressure in the forward direction in the fluid pressure operating mechanism 27.

Referring to Figs. 1, 2 and 3, it may be seen that the clutch 34 may comprise, for example, a rectangular body 40 of magnetic material having an annular groove 41 therein, in which may be positioned an operating winding 42 for producing the necessary magnetic flux. The annular groove 41 may be partially enclosed by means of a face plate 44 of a magnetic material of high permeability having a central opening 45 which defines with a central ring 46 also of high permeability, a peripheral air gap 47. The hollow connecting rod 30 of the fluid pressure actuating mechanism 27 may be provided with an armature 49 of high permeability magnetic material which may be disposed to bridge the peripheral air gap 47 for retaining the piston rod 30 in the retracted position when the operating winding 42 is energized.

The magnetic clutch 34 may be movably mounted on the supports 35 by being positioned on spacers 50 which may be secured to the supports 35 by means of nuts 51. The spacers 50 may pass through openings 53 in the body member 40 of the clutch and project slightly therebeyond, so as to provide a limited amount of longitudinal movement of the clutch relative to the supports. The rod 37 may be connected to the body member 40 in any suitable manner and it may, for example, pass through a central opening 55 in the body member, wherein it may be cured by a set screw 56. By such an arrangement the fluid pressure mechanism 27 may be adapted to bias the clutch 34 to the right under fluid pressure action, so that the rod 37 forces the clamp 14 toward the clamp 15.

Referring to Figs. 1, 4 and 5, it may be seen that the chucks or clamps 14 and 15 may comprise upper and lower insulating supports 60 and 61 having relatively movable pairs of upper and lower jaw members 62, 63 and 64, 65 mounted thereon in paired relation. The lower support 61 may be stationary being, for example, secured to the upper portion of the base 17. The jaw members 63 and 65 may be secured by screws 66 to the insulating support 61, which is in turn secured to the base by means of screws 68.

The upper insulating support 60 may be movable in the vertical direction relative to the lower support 61, being, for example, secured by screws 69 to a back plate 70 which may be actuated by means of a link (shown in Figs. 8 and 9) connected to the support 60 by means of a pin 71. The back plate 70 may be provided with guides 72 for limiting the upper support 60 to a movement in the vertical direction. The upper jaw members 62 and 64 may be secured by means of screws 73 to the insulating support 60.

The pairs of jaw members 62, 63 and 64, 65 comprising the clamps 14 and 15 may be movable relative to each other in a longitudinal direction. This movement may be provided by mounting the individual jaw members on the insulating supports 60 and 61 in channeled supports 77 which are secured to the insulating supports 60 and 61, and which may be provided with inturned edge portions 78 disposed to be positioned in longitudinal grooves 79 along the opposite edges of the jaw members. Bearing members 80 may be interposed between the jaw members and their respective supports to provide freedom of movement of the jaw members. Each of the jaw members may be provided with an arcuate recess 81 having end shoulders 82 to provide for securing charged members to be welded, such as sections for the tube or the like. Means such as the keys 83 may be positioned in transverse arcuate recesses 84 in the jaw members, to provide for alining the jaw members.

The switch means 32 may, as shown in Figs. 1, 6 and 7, comprise a support plate 85 insulating material having an elongated dove-tail recess 86 therein. A contact support 87, may be slidably mounted in the recess 86 and provided with means, such as, the spring 88 for biasing the support into engagement with adjusting means 89 which is movable in accordance with the position of the jaw members 64 and 65. A contact member 90 may be mounted on the contact support 87 for engagement with the hammer 25 to complete a circuit to a conductor 91 for effecting the discharge of electrical energy through the parts to be welded, in a manner which will be explained in detail hereinafter.

Referring to Figs. 1, 8 and 9, it may be seen that the jaw mechanism 13 may comprise a toggle plate 93 which may be mounted on a horizontal shaft 94 between front and rear plates 95 and 96 on the support 16, to provide with a link 97 mounted on the pin 71, an operating connection 69, which raises and lowers the upper jaw back plate 70 in response to movement of a head 98 which may be threadedly mounted on the piston rod 22 of the fluid pressure operating mechanism 19. A spring 99 may be connected to an arm 100 secured to the shaft 94, and to a pin 101 of the jaw mechanism for biasing the upper support 60 to the downward position. An extension 102 may be provided on the head 98 for operating a control switch 103 which serves to maintain a holding circuit for the clutch 34 and prevent energization of the jaw members, unless the jaw members are in the closed position.

As shown in Figs. 1, 8 and 9, a yoke 104 may be utilized for positioning the jaw members 64 and 65 of the clamp 14 in accordance with the movement of the head 98 when the fluid pressure operating mechanism 19 operates to retract the piston 23 and raise the upper jaw back plate 70. The yoke 104 may comprise a pair of depending legs 105 and 106 positioned in spaced relation and pivotally mounted in the base 17 of the machine on a bracket 107. The legs 105 and 106 may be positioned in recess 108 in the jaw members 64 and 65, and may be connected at the upper end by means of a connector 109 which is engaged by the head 98 when the piston rod 22 is retraced. The jaw members 64 and 65 may be biased towards the jaw members 62 and 63 by means of the elongated rod 37 which may be positioned in recesses 110 in the ends of the jaw members 64 and 65.

Referring to Fig. 10, the reference numeral 120 may denote, generally, a percussive welding system, wherein a condenser 122 is disposed to be charged from a source of alternating current 123 through rectifying means comprising electric valves 124, 125 which may be connected to the source 123 by means of a transformer 126 and a cutout switch 127.

The condenser 122 may be connected through a step-down welding transformer 128 to the jaw members 65 and 63 by means of inversely connected valves 130 and 131 of the arc discharge type. An electric valve 132 may be provided for energizing the ignitor 133 of the valve 130 in response to the operation of the switch means 32, which may be actuated in predetermined time relation to the upset blow by the hammer 25 as it is moved by the fluid pressure means 27 to engage the jaw members 64 and 65.

In order to prevent operation of the welding system until the condenser 122 reaches a predetermined value of charge, a neon discharge valve 135 may be utilized in connection with a discharge bias resistor 136 for applying a negative bias to the control grid 138 of a control valve 139 which is normally rendered conductive to effect energization of the operating winding 140 of control relay 142. The valve 135 also provides a bias control voltage to the control grids 143 of the rectifier valves 124 and 125 to terminate charging of the condenser. A condenser 137 holds the bias voltage for a predetermined time. An additional control relay 144 may be provided, which is normally energized through a control valve 145 after the control relay 142 operates to close contact members 142a and apply a positive bias to the control electrode 146.

Operation of the fluid pressure actuating means 19 and 27 may be effected by means of forward and reverse fluid pressure valve devices 150 and 151, which may be connected to the forward and reverse connections 20, 28 and 21, 29, and provided with operating windings 152 and 153, respectively, for operating the devices to alternately admit fluid pressure to the forward and reverse ends of the fluid pressure actuating means 19 and 27 under the control of the control relays 142 and 144. The magnetic clutch 34 may be energized from the source 123 through a control transformer 155 and a secondary control transformer 157, and an associated rectifier bridge circuit 158.

When the disconnect switch 127 is closed, the magnetic clutch 34 is immediately energized. When the start push button 160 is operated, the operating winding 140 of the control relay 142 is connected across the secondary winding of transformer 155 through the control valve 139, which is immediately rendered conductive. The control relay 142 operates, and applies a positive bias to control electrode 146 of the valve 145 through the rectifier device 162, thus rendering the valve 145 conductive. The operating winding 163 of the control relay 144 is, thereby, energized and the control relay 144 operates, providing a holding circuit around the start push button 160 through normally open contact member 144b.

At the same time, an energizing circuit is provided for the operating winding 165 of the primary switch 166 through normally open contact members 144a. The primary switch operates and connects the primary winding 167 of the transformer 126 to the source through contact member 166a. Since the valves 124 and 125 have zero bias, the condenser 122 charges.

As soon as the condenser 122 reaches a predetermined value of charge, the neon discharge valve 135 breaks down and a discharge current flows through control resistor 136. This produces a voltage drop across the resistor 136 in such a direction as to apply a negative bias voltage to the control electrode 138 of the electric valve 139 through which the control relay 142 is energized. The valve 139 is rendered nonconductive so that the control relay 142 returns to the deenergized position.

The bias voltage from the resistor 136 is also applied to the control grids of the valves 124 and 125, thereby preventing further charging of condenser 122. Condenser 137 holds blocking bias for a short time after discharge of 122 to prevent conduction in 124, 125 until switch 166 is deenergized.

An energizing circuit is now completed through normally closed contact members 142b and normally open contact members 144c for the operating winding 152 of the forward valve device 150. The valve device 150 is thereby operated, and fluid pressure is applied to the fluid pressure actuating devices 27 and 19 in the forward direction, so that the upper jaw member support 60 is actuated downwards, and the rod 37 which is connected to the magnetic clutch 34 restraining the hollow piston rod 30 urges the jaw members 64 and 65 longitudinally towards the jaw members 62 and 63 which are thereby backed up solidly against the stop 23.

As soon as the pressure in the fluid pressure operating means 27 reaches a predetermined operating value, the pressure switch 31 is operated and the energizing circuit for the electromagnetic clutch 34 is interrupted, since control switch 103 responsive to the position of the jaw members is already in the open position. Accordingly, the piston rod 30 is actuated to move the hammer 25 toward the right to strike the jaw members 64 and 65 of the clamp 14.

As soon as the hammer 25 engages the contact member 90 of the switch means 32, the negative bias voltage on the control electrode 169 of the control valve 132 is reduced sufficiently to permit the discharge device 132 to conduct and render the arc discharge device 130 conductive. The condenser 122 thereupon discharges through the primary winding of the welding transformer 128 so that an impulse of electrical energy is transmitted to the members positioned in the jaws of the welding apparatus. Almost immediately the discharge is effected, the hammer 25 strikes the jaw members 64 and 65 to provide a timed upset hammer blow which forces together the members being welded. This occurs preferably during the first half cycle of the condenser discharge.

When the control relay 144 reaches the de-energized position, the operating winding 153 of the reverse valve device 151 is energized through contact member 144d and control switch 168, so that the fluid pressure operating means 19 and 27 retract the jaw members and the hammer to provide for a subsequent operation.

Referring to Fig. 11, the reference numerals 170 and 171 may denote, generally, the upper and lower supports of a welding machine having means, such as fluid pressure device 172 for operating the upper support 170, towards and away from the lower support 171. Adjustable jaws 174, 175 may be secured to the supports 170 and 171, respectively, for securing members 177 and 178 which are to be percussively welded to each other.

The lower jaw 175 may be resiliently mounted, being for example, mounted in a sleeve 180 which may be electrically insulated from the support 171 by means of an insulating sleeve 182 and an insulating washer 183. The jaw 175 may be provided with a threaded stem 185 which projects through an opening 186 in the bottom of the sleeve 180. A spring 187 may be interposed between the bottom of the sleeve 180 and the jaw 175, and nut 188 may be provided on the stem 185 for adjusting the tension of the spring 187 to different predetermined values. The inertia of the jaw 175 may be varied by using nuts 188 of different weights.

The upper jaw 174 may be slidably mounted in a sleeve 190 secured to the upper support 170. A spring 191 may be provided for normally biasing the upper jaw 174 downwardly against the lower jaw 175, to maintain a predetermined minimum contact pressure between the members 177 and 178.

A hammer 193 may be slidably positioned in the sleeve 190 for applying a percussive blow to the upper end of the jaw 174. The hammer may comprise a head portion 194 having an elongated stem 195 with a recess having a shoulder 196 adjacent the upper end for engaging a latch 197 which may be adjustably mounted on the frame 198 of the welding machine and disposed for operation in any suitable manner to release the hammer. A spring 200 may be positioned around the stem 195 for biasing the hammer 193 downwardly to strike the upper jaw 174.

Means such as the condenser 202 may be provided for effecting a rapid discharge of electrical energy between the members 177 and 178 in order to weld them together. The condenser may be charged from any suitable source of electrical energy which may be represented by the battery 203. An impedance 204 may be provided in series-circuit relation with the condenser 202 and the source 203 for limiting the discharge of the electrical energy from the source when the condenser is being discharged.

Inversely connected valve devices 205 and 206 may be provided in conjunction with a control valve 207 having a control electrode 207a for discharging the condenser 202 through the primary winding 208 of a welding transformer 209, having a secondary winding 210 connected to the jaw members 174 and 175.

In order to effect discharge of the condenser 202 in timed relation to the hammer blow struck by the hammer 193, a control switch 212 may be provided. Either entire switch 212, or projection 218 may be adjustable for effecting different discharge time control. This control switch may comprise a pair of normally spaced contact members 213 and 214 which may be adjustably mounted in any suitable manner in spaced and insulated relation upon the sleeve 190 by means of insulation 215 and screws 216. A projection 218 may be provided in connection with contact member 214 for engagement with the head of the hammer 193 as it moves to strike the jaw member 174. By connecting the contact members 213 and 214 across a portion of a control resistor 220 in the grid circuit of the valve 207, the discharge device 205 may be rendered conductive as soon as the head 194 of the hammer strikes the switch projection 218 and causes the negative bias applied to the control electrode 207a to be reduced sufficiently. A condenser 222 between grid and switch 212 permits momentary short circuiting of grid bias without sustained current drain. A shunt resistor 223 bleeds charge from the capacitor between welds.

In operation, fluid pressure may be applied to the fluid pressure device 172 to raise the upper support 170. This carries the hammer 193 upwardly so that the latch 197 enters the recess 196 and separates the jaws for unloading or loading. Fluid pressure may be then applied so as to force the upper support 170 downwardly until the members 177 and 178 in the jaws 174 and 175 are in engagement. The hammer 193 is retained in the retracted position by the latch 197.

When the latch 197 is released, the hammer 193 is also released and is actuated by the spring 200 toward the jaw member 174 to strike a percussive blow. When the head of the hammer engages the switch projection 218, the contact members 213 and 214 are connected, and the condenser 202 is discharged to provide an electrical impulse between the members 177 and 178 immediately prior to the impact of the hammer 193 on the upper jaw member 174. Accordingly, the surfaces of the members 177 and 178 are rendered molten, and almost instantaneously a percussive force is applied to produce an upset and effect a weld between the members.

From the above description and the accompanying drawings, it will be seen that I have provided welding apparatus and a method of welding in which the voltage which can appear at the electrode jaws, and the duration of the voltage are both so small that the process is electrically safe. The process is also mechanically safe since the movement of the jaws is relatively slight. The hammer which travels at a high speed and has a relatively long path of movement, is separate from the jaws and may thus be readily shielded. By using a welding transformer to couple the condenser source of welding energy to the members to be welded, the value of the welding current may be very high while the condenser is operated at an efficiently high voltage and a relatively low frequency and current. The use of a welding transformer also permits the use of a relatively small and, therefore, low reactance loop in that portion of the welding circuits which carries the relatively high values of welding current.

The condenser discharge current is determined by the equivalent inductance of the welding circuit, plus the inductance of the connections to the condenser. The primary current depends principally on the square root of the total reactance, and the secondary or welding current is greater than the primary current by the ratio of transformation. The square root of the total inductance will normally be greater than the square root of the inductance of the condenser connections, but will normally be much less than the ratio of transformation times as great. It will, therefore, be seen that it is possible to obtain much higher values of welding currents by using a welding transformer than if the condensers were discharged directly between the pieces to be welded. This is an important feature, since it is highly desirable to obtain an arc over the entire weld surfaces, and the area covered by the arc is invariably the function of the current density.

In operation, the efficiency of the method proposed in my invention is readily illustrated by the fact that better welds may be made with one condenser unit of 120 microfarads charged to 2500 volts than could be made with four units charged to the same voltage in the case of the direct connection. An additional advantage of the present method lies in the relative flatness of the voltage-current characteristic which may be obtained. The short circuit current, for instance, may be two or more times as great as the current during the arcing process, whereas, with the condenser discharge systems of the prior art the short circuit current is only slightly greater. The relatively high short-circuit current provided by the present invention serves to, more positively, burn away the original surface regardless of surface preparation. Furthermore, enough contact pressure may be used between the weld surfaces so that the current in the welding circuit builds up to the peak arcing current before the arc is established. In addition, since the current tends to drop rapidly as the voltage across the weld pieces rises, any tendency for the arc to overheat a point on the weld surfaces or to climb the higher edges of the weld pieces causes the arcing current to reduce and the arc to transfer to cooler surfaces and/or a shorter path.

The system of my invention is extremely flexible. By changing the transformer turns ratio, and without necessarily changing either the size of the condenser, or the voltage at which it is operated, it is possible to change from a highly damped unidirectional discharge to a relatively high frequency oscillating discharge. Since the position of the switch means 32 is maintained in the same relative position to the jaw members regardless of differences in the sizes of the pieces to be welded, satisfactory welds may be easily made on pieces of varying dimensions without requiring complicated adjustments between welds.

Discharge frequencies in the range of 50 to 3000 cycles per second may be used effectively, the higher frequencies being more desirable when welding materials have widely different melting points and/or thermal capacities. Frequencies in the lower range may be used in welding copper to copper, or steel to steel. In practice, I have used a relatively narrow range of frequencies of from about 300 to 500 cycles per second with a wide variety of materials and with settings of the switch means varying as much as one quarter of an inch. In general, the switch means may be adjusted so that the hammer strikes the upset blow during the first half cycle of the condenser discharge, preferably between the peak and the end of the first half cycle. Satisfactory welds have been made on many combinations of materials under these conditions, using hammer speeds of from about 100 to 500 inches per second.

Since certain changes may be made in the above described construction, and different embodiments of the invention may be made without departing from the spirit or scope thereof, it is intended that all the matter contained in the above description and shown in the accompanying drawings shall be considered as illustrative and not in a limiting sense.

I claim as my invention:

1. A method of welding which comprises, prepositioning a pair of metallic members with surfaces in contact, passing an electrical discharge from a condenser therebetween sufficient to produce a fluid condition of the members at the contacting surfaces, and applying a relatively sharp blow to at least one of the members such as to force said one member against the other member and force the contacting surfaces together between the peak and the end of the first half cycle of the condenser discharge.

2. In a method of percussive welding electrically conductive members which comprises the steps of positioning the members with surfaces to be welded in contact, connecting a charged electrical condenser between the members so as to produce a sudden discharge of electrical energy between said surfaces, and striking one of the members a sharp blow to force it against the other member during the latter portion of the discharge of electrical energy between said surfaces to force the surfaces together.

3. The method of percussive welding which comprises, positioning a pair of metal members in engagement in substantially the position in which they are to be welded, passing a predetermined condenser discharge welding current impulse through the juncture of said members, and applying a relatively sharp hammer blow to one of the members in a direction to force it toward the other member in predetermined timed relation to said impulse and during the first half cycle thereof to force said members together.

4. Percussive welding apparatus comprising, relatively movable clamp means arranged to hold members which are to be welded, means operable to bias the clamp members to position the members to be welded in engagement with each other, circuit means including a stored energy source of electrical energy, means operable to apply a hammer blow to the member in the movable one of the clamp means in a direction to force it against the other member, and switch means actuated by the said means connecting the circuit means in circuit relation with the members in timed relation to the hammer blow.

5. Welding apparatus comprising, a fixed clamp and a relatively movable clamp arranged to hold and position members to be welded in contacting relation, means operable to urge the movable clamp toward the other one, a hammer movable axially of the clamps to strike the movable clamp and force it toward the other one, circuit means including a condenser disposed to be charged from a source of electrical energy, and switch means responsive to movement of the hammer to strike the movable clamp operable to connect the circuit means between the members to be welded in timed relation to initiate discharge of the condenser immediately prior to the time when the hammer strikes the movable clamp.

6. Percussive welding apparatus comprising, pairs of jaw members for holding members to be welded, means biasing the jaw members to maintain the members in engagement, a hammer slidable axially of the jaw members, means operable to apply an accelerating force for actuating the hammer to strike one of the jaw members and force it toward the other jaw member to apply an upset force to the members to be welded, means resiliently supporting the other jaw member, and switch means actuated in response to movement of the hammer for controlling the energization of the members to be welded in timed relation to the application of the upset force.

7. Percussive welding apparatus comprising, two pairs of jaw members operable to clamp members to be welded, a stationary support mounting one of the jaw members of each pair, a support movable axially of the jaw members mounting the other jaw member of each pair, fluid pressure means operable to move the movable support axially of said other jaw members, a hammer disposed to be actuated to a retracted position in accordance with operation of the fluid pressure means to separate the jaw members, retaining means operable to maintain the hammer in the retracted position, control means operable to effect release of the hammer from the retaining means for striking one of the pairs of jaw members, and switch means actuated by the hammer to connect the members to be welded to a stored energy source of welding current.

8. In a welding system, a condenser, circuit means connecting the condenser to a source of electrical energy for effecting the charging thereof, relatively movable clamp members for gripping members to be welded together, a welding transformer having a secondary winding connected between the clamp members and a primary winding, valve means connected between the condenser and the primary winding for discharging the condenser, switch means operable to render the valve means conductive, a hammer operable to effect operation of the switch means and to strike one of the relatively movable clamp members to force it toward the other clamp member and provide an upset force to said members to be welded in the first half cycle of the discharge of the condenser.

9. A percussive welding system comprising, a pair of relatively movable jaw members arranged to hold members to be welded, a movable support for one of the jaw members, fluid pressure means operable to retract said support axially of the jaw members and return it to the weld position, means biasing the one jaw member relative to the movable support and toward the other jaw member, a hammer carried by the support and normally biased toward said one jaw member, means operable to retain the hammer in a retracted position when the support is returned to the weld position and actuable to release the hammer for providing an upset blow, switch means carried by the support actuated by the hammer when it is released from the retracted position, and circuit means including a welding transformer connected to the jaw members, a condenser source of stored electrical energy and electric valve means rendered conductive by the switch means to provide an impulse of electrical energy having a frequency of from 50 to 2000 cycles per second between the members in timed relation to the application of the hammer blow thereto.

10. A percussive welding machine comprising, a pair of supports relatively movable in one direction, a pair of clamps relatively movable in a different direction, each of said clamps comprising paired jaw sections mounted one on each of the supports, means providing a stop for one clamp, actuating means operable to bias the other clamp toward said one clamp, a hammer operable to strike said other clamp an abrupt blow, means including a condenser disposed to be charged from a source of electrical energy and valve means operable to connect the condenser between said clamps for providing a relatively high frequency discharge, and switch means actuated in response to predetermined movement of the hammer to render the valve means operable.

11. In a welding system, clamp means securing pieces to be welded in welding position, a fluid pressure operated hammer actuable to provide an upset force between the pieces, means responsive to the application of fluid pressure to the hammer to initially bias the pieces together, and means responsive to movement of the hammer toward the pieces for effecting a discharge of welding current between the pieces having a frequency of from 300 to 500 cycles per second, said means being arranged to effect such discharge in such timed relation to the hammer blow that the hammer blow occurs during the first half cycle of said discharge.

12. In a welding system, clamp means securing members to be welded initially in engagement, a transformer having a secondary winding connected between said means and a primary winding, circuit means including a switch for connecting a source of stored electric energy to the primary winding, switch means operable to effect operation of the switch to connect the condenser to the primary winding, and a hammer operable to actuate the switch means and apply an upset force to one of the members to be welded to force it against the other member during discharge of the condenser.

13. Welding apparatus comprising, means actuable to clamp members to be welded, means including a hammer and fluid pressure means operable to actuate the hammer to produce an upset between the members to be welded, means including locking means to retain the hammer in a retracted position in opposition to the fluid pressure means, a condenser, means for charging the condenser, means responsive to a predetermined condition of condenser charge operable to prevent operation of the fluid pressure means, manual switch means operable to initiate charging of the condenser, circuit means including switch means actuated by the hammer connecting the condenser to produce a current impulse between the members to be welded in timed relation to the upset produced by the hammer.

14. For use with percussive welding apparatus having relatively movable jaws for clamping members to be welded and a hammer arranged to strike one of the jaws to produce an upset between the members, a welding transformer having a relatively small number of secondary turns connected between the jaws and a relatively large number of primary turns, circuit means including an electric valve and a condenser connected across the primary turns, control means responsive to predetermined conditions of charge of the condenser for effecting operation of the hammer, and means responsive to operation of the hammer for effecting discharge of the condenser.

15. For use in percussive welding, a welding transformer having primary and secondary windings with a high ratio of primary to secondary turns, relatively movable clamp means connected to the secondary winding and arranged to secure members to be welded in welding position, a hammer actuable to apply an upset blow to the members, fluid pressure means operable to actuate the clamp means to bias the members into engagement and actuate the hammer, and control means including switch means positionable in different axial positions in accordance with relative axial positioning of the jaw members actuable in response to movement of the hammer to apply an upset blow for effecting energization of the primary winding.

16. In a welding system, clamp means operable to position members to be welded in engagement, a transformer having a secondary winding connected between said means and a primary winding, a hammer operable to strike one of said clamp means to produce an upset between the members to be welded, fluid pressure means operable to actuate the hammer, means operable to restrain the hammer and bias the clamp means toward each other, a condenser, circuit means including a switch for connecting the condenser to a source of electrical energy for effecting the charging thereof, control means operable to effect operation of the switch means, said control means being responsive to a predetermined condition of charge of the condenser for rendering the hammer restraining means ineffective whereby the fluid pressure means actuates the hammer, valve means connected in circuit relation with the primary winding and the condenser, and switch means positionable in accordance with said one clamp means actuated by the hammer to render the valve means conductive in predetermined relation to the hammer blow.

ALFRED B. WHITE.

REFERENCES CITED

The following references are of record in the file of this patent:

UNITED STATES PATENTS

| Number | Name | Date |
| --- | --- | --- |
| 451,345 | Thomson | Apr. 28, 1891 |
| 1,066,468 | Chubb | July 8, 1913 |
| 2,004,619 | Tarbox | June 11, 1935 |
| 2,272,968 | Dyer | Feb. 10, 1942 |
| 2,383,695 | Thacker | Aug. 28, 1945 |
| 2,419,749 | Weinhardt et al. | Apr. 29, 1947 |